United States Patent Office 2,816,058
Patented Dec. 10, 1957

2,816,058
LAXATIVE COMPOSITION CONTAINING ALBEDO

Gregory Stragnell, Short Hills, N. J.

No Drawing. Application May 13, 1954,
Serial No. 429,699

3 Claims. (Cl. 167—56)

This invention relates to a preparation for treating constipation.

The object of this invention is to provide a preparation for treating simple, relatively recent constipation and chronic constipation and the resulting disturbance of many normal functions of the human system resulting from constipation.

The public uses many laxatives and cathartics for the treatment of constipation which are harsh and cause griping and upon continuous use abolish normal defecatory reflexes. Some have undesirable side effects in the gastrointestinal tract. Many of these products are objectionable in that they are purgative. Some accumulate, under certain conditions, and cause impaired renal function in the body fluids and may be sufficient to lead to symptoms of poisoning.

This invention provides a preparation which has a mildly laxative effect in from six to twenty-four hours. It will not, like saline cathartics, lessen the water content of the body. It will not cause dehydration like the saline cathartics, nor impaction. It avoids the "continuous" phase jel characteristic of methylcellulose. On the contrary, the preparation of this invention provides a "discontinuous" phase jel in which the particles remain discrete and in the individual form mix with the user's food during digestion and perform the mild, non-toxic, non-griping action desired of a laxative. Other advantages of this invention will appear hereinafter.

The preparation of this invention comprises as one of its factors the white fibrous membrane between the pigmented skin and pulpy or meaty portions of citrus fruit, such as oranges, grapefruit and also the juice sac walls of such fruit, which membranes are collectively identified as albedo. The albedo is refined, dried and ground to a mesh size fineness between substantially 20 to 80. It is preferred that the preparation be made up of substantially 75% granules between 20 and 40 mesh size and substantially 25% between 40 and 80 mesh size. The resulting products represent individual dry and hard particles. The major portion of the particles are within the screen sizes specified with some fines which, while they are not objectionable, will not perform the functions desired in the practice of this invention. The particles are tableted with suitable standard binding agents for which purpose starch and bicarbonate of soda have been found satisfactory.

Each tablet contains substantially a predetermined amount of albedo. It has been determined that a satisfactory amount of albedo for each tablet comprises 0.50 gram and the balance other agents as hereinafter set forth. A daily dose should be from 3 to 6 tablets (1.5 to 3 grams of albedo).

A mass of .50 gram of albedo is mixed with a vehicle such as one-half gram of starch and one gram of bicarbonate of soda. This mass is then compressed into tablet or wafer form, its size being reduced to about one twentieth of the volume of the loose original mixture of all of the ingredients. The resulting tablet is sufficiently small to be swallowed, firm to packaging and handling, and readily breakable into segments.

The tablets when taken by mouth, upon entering the acid stomach, commence to disintegrate and the individual particles are released, mixing with the food in the stomach as digestion proceeds and retaining in such mixture their discrete character.

The particles of albedo, as the stomach empties into the intestines, pass thereinto with the food in their discrete condition and swell in the intestines to many times (as much as 50 times) their original size.

Albedo contains protopectin and water soluble constituents. The water soluble factors are of no special interest to this invention. The protopectin constitutes combined fibre and pectin. In the intestinal tract the protopectin is split into fibre and pectin, the fibres being individually enveloped or coated with the pectin as a mucilaginous coating, the fibre and pectin remaining in such relation in the intestinal tract, each former particle as a discrete unit, coated with pectin, and in swollen condition, distributed through the food contents of the gastrointestinal tract.

When the stomach contents enter the intestines, pectin, in the alkaline condition of the intestines, is biochemically disintegrated first to pectinic acid and then to pectic acid while still associated with the fibre. The extent to which the pectin is disintegrated in the alkaline reaction is controlled by the alkaline condition of the user's intestines. In all instances the reaction will produce pectic acid and in most instances a residue of pectinic acid.

During the entire time the preparation remains in the intestines, it retains its swollen condiiton and retains the form of discrete units mixed and distributed throughout the contents of the intestines.

The breakdown of albedo in the gastrointestinal tract into the combination of fibre and its mucilaginous coating also results, in addition to the production of pectic acid, in the production of galactose complexes which are also mildly laxative.

Fibre is necessary to provide roughage but fibre in its normal action is too irritating. Pectin as a mucilaginous material is emollient but not sufficiently active to initiate intestinal movement. The combination of the two factors provides a medium which is satisfactory to provide a laxative action. The material is not harsh in its action nor does it cause griping. It provides both roughage and smoothage.

Apparently (this explanation being advanced merely as a theory) the preparation in its converted form as pectinic acid is capable of combining with basic materials derived from the breaking down of protein in foods in the intestines. On the bases of this theory, such combination should cause detoxification of toxic alkaline materials and before such toxic factors can pass through the walls of the intestines they are detoxified by combining with the pectinic acid whereby their rapid assimilation is prevented.

The preparation may also be combined with the standard anthraquinone laxative of which frangula, phenolphthalein, and cascara are examples. In such instances, it is preferred to reduce the amount of albedo to 0.45 gram per tablet and add thereto aged cortex frangula or cascara or other anthraquinone laxative to the amount of 0.05 gram. The tablets are otherwise prepared in the same manner as above and react in the same manner as described with the added laxative action of the anthraquinone factor.

It has been found that the addition of the added anthraquinone laxative does not cause harsh action or griping.

The most reasonable theory to explain such lack of harsh action and griping is that the enzymes of the intestines form an uronic acid with the pectinic acid and combine with the laxatives of the anthraquinone series, the laxative factor being thereafter released without griping in contradistinction to the normal unsatisfactory action of such anthraquinone laxatives.

I claim:

1. A preparation for treating constipation of humans comprising a tablet initially composed of innumerable normally loose, substantially hard and dry particles of albedo, a minor portion of frangula and a binding agent, the amount of albedo and frangula in the tablet being in the relation of about 0.45 gram of albedo to about 0.05 gram of frangula, said particles being compressed into tablet form, self-sustaining and readily administered by swallowing, the compressed tablet disintegrating in the stomach into substantially the original sizes of said particles, and the albedo particles, in the gastro-intestinal tract, swelling to many times their original size and in the swollen condition retaining their discrete characteristics.

2. A preparation for treating constipation of humans comprising a tablet initially composed of innumerable normally loose, substantially hard and dry particles of albedo and a binding agent, the major portion of said particles having substantially between 20 and 80 mesh size, said particles being compressed into tablet form, self sustaining and readily administered by swallowing, said compressed tablets disintegrating in the stomach into substantially the original sizes of said particles and in the gastro-intestinal tract swelling to many times their original size and in the swollen condition retaining their discrete characteristics.

3. A preparation for treating constipation of humans comprising a tablet initially composed of innumerable normally loose, substantially hard and dry particles of albedo, a minor portion of an anthraquinone laxative and a binding agent, the amount of albedo and said laxative, in the tablet, being in the relation of about 0.45 gram of albedo to about 0.05 gram of said laxative said particles of albedo being compressed into tablet form, self-sustaining and readily administered by swallowing, the compressed tablet disintegrating in the stomach into substantially the original sizes of said particles, and the albedo particles, in the gastro-intestinal tract, swelling to many times their original size and in the swollen condition retaining their discrete characteristics.

References Cited in the file of this patent

UNITED STATES PATENTS 2,043,204   Spalding _____ June 2, 1936

OTHER REFERENCES

Braverman: Citrus Products, Interscience Pub., Inc., N. Y. C., 1949, pp. 88–96.

U. S. Dispensatory, 24th ed., 1947, pp. 826–828 and 1459.

Harlay: J. Pharm. Chim., vol. 5, 1912, pp. 344–347.